United States Patent
Jung et al.

(10) Patent No.: US 11,385,812 B2
(45) Date of Patent: Jul. 12, 2022

(54) STORAGE DEVICE, STORAGE SYSTEM, AND OPERATING METHOD THEREOF CAPABLE OF DYNAMICALLY ALLOCATING WRITE BLOCKS TO A STREAM

(71) Applicant: SAMSUNG ELECTRONICS CO., LTD., Suwon-si (KR)

(72) Inventors: Sang Won Jung, Busan (KR); Min Ji Kim, Suwon-si (KR); Hye Jeong Jang, Hwaseong-si (KR); Su Hwan Kim, Hwaseong-si (KR); Min Sik Son, Hwaseong-si (KR); Dong Hwan Jeong, Hwaseong-si (KR); Young Rae Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 67 days.

(21) Appl. No.: 16/987,563

(22) Filed: Aug. 7, 2020

(65) Prior Publication Data
US 2021/0141546 A1    May 13, 2021

(30) Foreign Application Priority Data
Nov. 11, 2019  (KR) .......................... 10-2019-0143096

(51) Int. Cl.
*G06F 3/06* (2006.01)

(52) U.S. Cl.
CPC .......... *G06F 3/0631* (2013.01); *G06F 3/0604* (2013.01); *G06F 3/064* (2013.01); *G06F 3/0656* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 6,490,250 | B1 * | 12/2002 | Hinchley | H04N 21/23655 |
| | | | | 375/E7.199 |
| 7,139,873 | B1 * | 11/2006 | Ruster | G06F 3/0613 |
| | | | | 711/113 |
| 8,667,215 | B2 | 3/2014 | Marotta et al. | |
| 8,700,961 | B2 | 4/2014 | Lassa et al. | |
| 8,949,568 | B2 | 2/2015 | Wei et al. | |
| 9,477,681 | B2 | 10/2016 | Malina | |
| 9,547,589 | B2 | 1/2017 | Yu et al. | |
| 10,049,035 | B1 * | 8/2018 | Kulkarni | G06F 12/0246 |
| 2007/0177519 | A1 * | 8/2007 | Thomsen | H04L 12/6418 |
| | | | | 370/252 |

(Continued)

FOREIGN PATENT DOCUMENTS

KR    1020170063332 A    6/2017

*Primary Examiner* — Kevin Verbrugge
(74) *Attorney, Agent, or Firm* — Sughrue Mion, PLLC

(57) ABSTRACT

A storage device includes a nonvolatile memory device including a plurality of nonvolatile memories; a controller configured to allocate write blocks of the nonvolatile memory device to a plurality of streams provided from an outside; and a buffer memory configured to store a result of allocation of the write blocks to the plurality of streams, wherein the controller is further configured to reallocate the write blocks of the nonvolatile memory device to the plurality of streams based on the result of allocation stored in the buffer memory.

16 Claims, 15 Drawing Sheets

(56) References Cited

U.S. PATENT DOCUMENTS

| | | | |
|---|---|---|---|
| 2008/0273545 A1* | 11/2008 | Sgouros | H04L 45/00 370/412 |
| 2016/0162354 A1 | 6/2016 | Singhai et al. | |
| 2018/0276116 A1 | 9/2018 | Hahn et al. | |
| 2019/0056867 A1 | 2/2019 | Hashimoto | |
| 2019/0164598 A1* | 5/2019 | Shukla | G06F 3/0604 |

* cited by examiner

FIG. 4

Table 1

|  | Stream 1 | Stream 2 | Stream 3 |
|---|---|---|---|
| Performance Ratio(%) | 10 | 10 | 80 |
| Performance(MB/s) | 100 | 100 | 800 |
| Block Number | 1 | 1 | 8 |

FIG. 9

Table 2

| | Stream 1 | Stream 2 | Stream 3 |
|---|---|---|---|
| Performance Ratio(%) | 10 | 50 | 40 |
| Performance(MB/s) | 100 | 500 | 400 |
| Block Number | 1 | 5 | 4 |

310 — Performance Ratio(%)
410 — Performance(MB/s)
510 — Block Number

STORAGE DEVICE, STORAGE SYSTEM, AND OPERATING METHOD THEREOF CAPABLE OF DYNAMICALLY ALLOCATING WRITE BLOCKS TO A STREAM

CROSS-REFERENCE TO THE RELATED APPLICATION(S)

This application claims priority from Korean Patent Application No. 10-2019-0143096 filed on Nov. 11, 2019 in the Korean Intellectual Property Office, and all the benefits accruing therefrom under 35 U.S.C. 119, the contents of which in their entireties are herein incorporated by reference.

BACKGROUND

1. Technical Field

Example embodiments of the disclosure relate to a storage device, a storage system, and an operating method thereof.

2. Description of the Related Art

A storage device is a nonvolatile storage medium, and data stored in the storage device may be permanently or semi-permanently stored regardless of power supply. The storage device may be operated electrically like a semiconductor memory instead of being operated mechanically.

A host using the storage device may generate various kinds of data depending on an application. The host may provide the storage device with data along with information on the data in order to improve an operation of the storage device.

Based on the information on the data provided from the host, the storage device may allocate nonvolatile memory blocks (or may be referred to as write blocks) of the storage device to respective data. However, the write blocks may not be allocated to the information (e.g., a stream) on the data upon which the storage device may achieve the maximum performance. In other words, the host and/or the storage device need to dynamically change the number of write blocks allocated to the information (e.g., a stream) on the data depending on a status of the host and/or the storage device.

SUMMARY

One or more example embodiments of the disclosure provide a storage device capable of dynamically calculating and allocating write blocks to be allocated to a stream.

One or more example embodiments of the disclosure also provide a storage system capable of dynamically calculating and allocating write blocks to be allocated to a stream.

One or more example embodiments of the disclosure also provide an operating method of a storage system capable of dynamically calculating and allocating write blocks to be allocated to a stream.

According to an aspect of an example embodiment of the inventive concept, there is provided a storage device including: a nonvolatile memory device including a plurality of nonvolatile memories; a controller configured to allocate write blocks of the nonvolatile memory device to a plurality of streams provided from an outside; and a buffer memory configured to store a result of allocation of the write blocks to the plurality of streams, wherein the controller is further configured to reallocate the write blocks of the nonvolatile memory device to the plurality of streams based on the result of allocation stored in the buffer memory.

According to an aspect of an example embodiment of the inventive concept, there is provided a storage system storage system including: a host; and a storage device configured to receive a plurality of streams and first real-time information on the plurality of streams from the host, wherein the storage device includes: a nonvolatile memory device including a plurality of nonvolatile memories; and a controller configured to calculate a number of write blocks to be allocated to each of the plurality of streams based on the first real-time information, and allocate write blocks of the nonvolatile memory device to each of the plurality of streams based on a result of calculation.

According to an aspect of an example embodiment of the inventive concept, there is provided a storage system including: a host including a host memory, a processing unit configured to execute a program code loaded in the host memory, and an interface circuit configured to transmit data received from the host memory and the processing unit to an outside; and a storage device configured to exchange the data with the host, wherein the storage device includes: a controller configured to allocate write blocks to each of a plurality of streams, the controller including a block calculator which calculates a number of write blocks to be reallocated to each of the plurality of streams based on first real-time information on the plurality of streams; a memory device configured to exchange the data with the controller through a channel, the memory device including a plurality of nonvolatile memories; and a buffer memory including a memory different from the plurality of nonvolatile memories.

According to an aspect of an example embodiment of the inventive concept, there is provided an operating method of a storage system, the method including: receiving, from a host, a request to change performance of each of a plurality of streams and a target performance ratio for each of the plurality of streams; calculating, via a block calculator in a storage device, the performance of each of the plurality of streams based on the target performance ratio for each of the plurality of streams received from the host, and transmitting the calculated performance to the host; upon receiving an approval on the calculated performance from the host, calculating, by the storage device, a number of write blocks to be allocated to each of the plurality of streams based on the calculated performance; and allocating, via a block allocator in the storage device, the calculated number of write blocks to each of the plurality of streams.

However, aspects of the disclosure are not restricted to those set forth herein. The above and other aspects of the disclosure will become more apparent to one of ordinary skill in the art to which the disclosure pertains by referencing the detailed description of the disclosure given below.

BRIEF DESCRIPTION OF THE DRAWINGS

The above and other aspects and features of the disclosure will become more apparent by describing in detail example embodiments thereof with reference to the attached drawings.

FIG. 4 is a table describing information about each of a plurality of streams, according to some example embodiments.

FIG. 9 is a table describing information on each of a plurality of streams according to some example embodiments.

DETAILED DESCRIPTION

Hereinafter, example embodiments will be described in detail with reference to the accompanying drawings.

Figure 1:
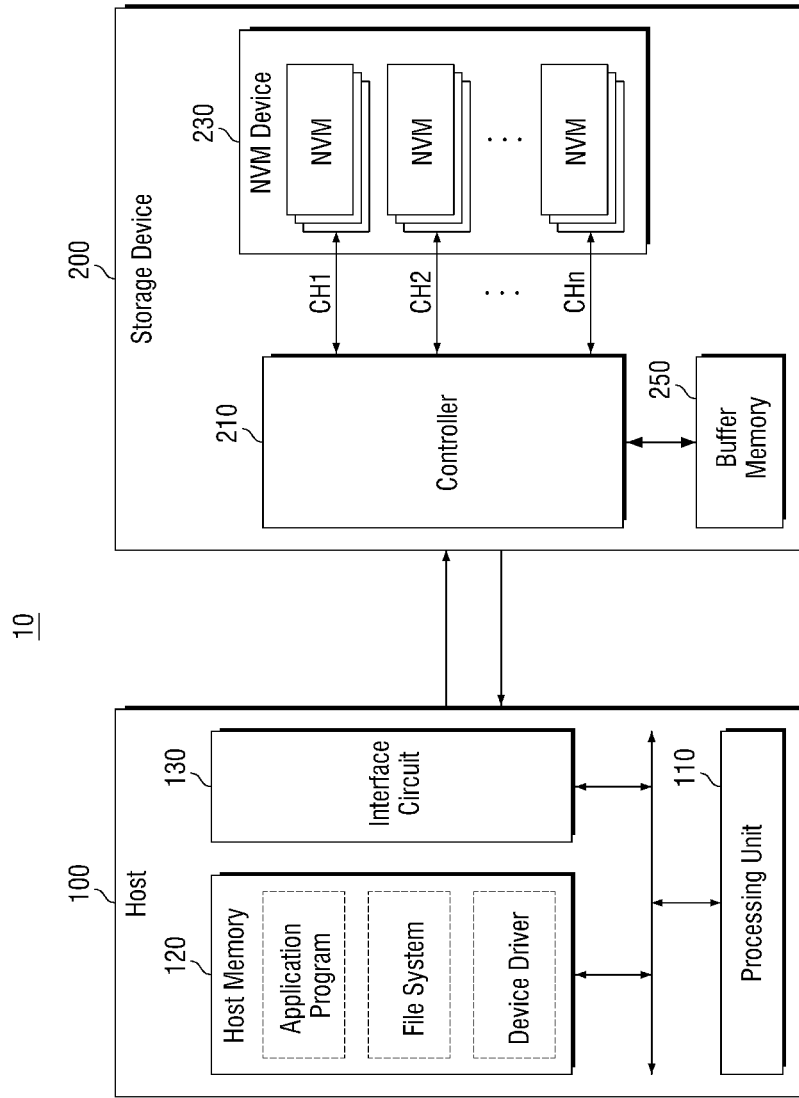
FIG. 1 is a block diagram illustrating a storage system according to some example embodiments.
Figure 2:
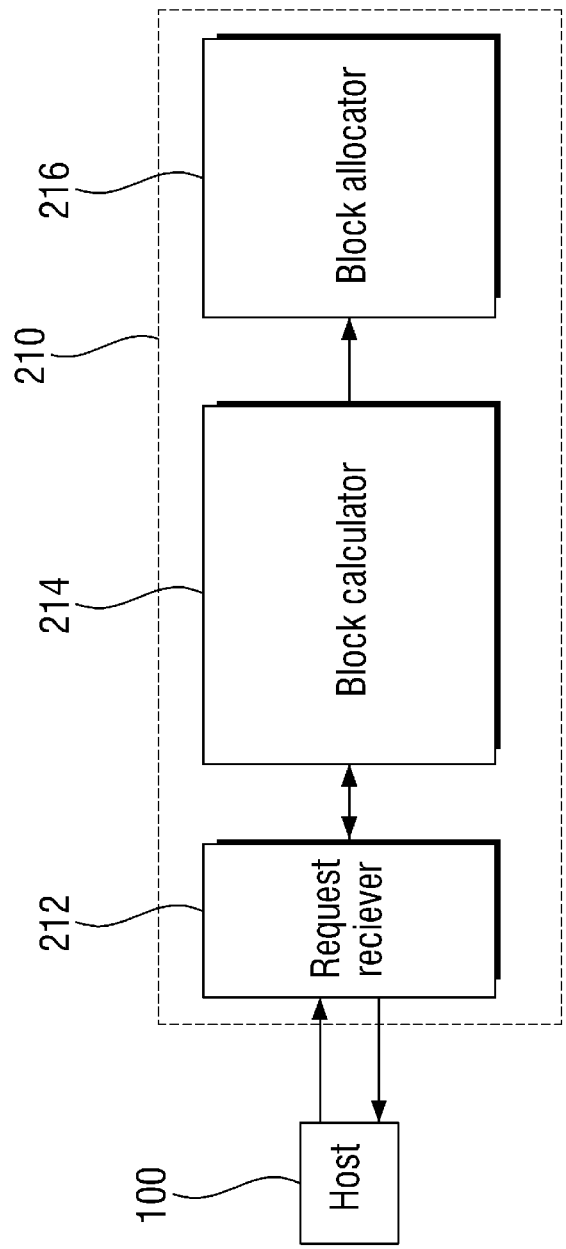
FIG. 2 is a block diagram illustrating a controller in a storage device according to some example embodiments.

FIG. 1 is a block diagram illustrating a storage system according to example some embodiments. FIG. 2 is a block diagram illustrating a controller in a storage device according to some example embodiments.

Referring to FIG. 1, a storage system 10 according to some example embodiments may include a host 100 and a storage device 200.

The host 100 may transmit data along with a stream to the storage device 200 (e.g., a solid state drive (SSD)) to store the data in the storage device 200. The host 100 may assign a stream identifier (ID) to the data depending on the type of data such as a log file, a meta file, a media file, and the like.

The host 100 may assign different stream IDs to a data set depending on the type of data and transmit a multi-stream data set to the storage device 200. For example, the host 100 may assign a first stream to data corresponding to a log file, and assign a second stream to data corresponding to a media file.

For example, in order to prevent short-lived hot data and long-lived cold data from being stored together in the same location (e.g., write blocks) of the storage device 200, the host 100 may assign different stream IDs to different data, respectively. The storage device 200 may allocate a certain number of write blocks to data having the same stream ID.

The host 100 may include a processing unit 110, a host memory 120, and an interface circuit 130. The processing unit 110 may execute various software (e.g., an application program, an operating system, a device driver, and the like) loaded in the host memory 120. The processing unit 110 may execute an operating system (OS) or application programs. The processing unit 110 may include homogeneous multi-core processors or heterogeneous multi-core processors. For example, the processing unit 110 may include at least one of a central processing unit (CPU), an image processing unit (ISP), a digital signal processing unit (DSP), a graphics processing unit (GPU), a vision processing unit (VPU), or a neural processing unit (NPU), but is not limited thereto.

An application program, a file system, a device driver and the like for driving the storage system 10 may be loaded into the host memory 120. However, the disclosure is not limited thereto, and various other software for driving the storage device 200 may be loaded into the host memory 120. The host memory 120 may be loaded with application programs or data to be processed by the processing unit 110. For example, an input/output scheduler (not shown) for managing a submission queue and a completion queue for commands to be delivered to the storage device 200 may be loaded into the host memory 120.

The interface circuit 130 may provide physical connections between the host 100 and the storage device 200. For example, the interface circuit 130 may convert commands, addresses, data sets, and the like corresponding to various requests generated in the host 100 into to be usable for interfacing with the storage device 200. For example, the interface circuit 130 may be configured to communicate with the storage device 200 by using at least one of various communication methods such as Universal Serial Bus (USB), Serial AT Attachment (SATA), Serial Attached SCSI (SAS), High Speed Inter Chip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), Multi Media Card (MMC), and Embedded MMC (Emmc), but is not limited thereto.

The storage device 200 may include a controller 210, a nonvolatile memory device 230, and a buffer memory 250.

The controller 210 may process various commands provided from the host 100. The various commands provided from the host 100 may include a write command having a plurality of streams. The controller 210 may calculate the number of write blocks to be allocated to each of the streams and allocate the write blocks to each of the streams. The write blocks to be allocated to each of the streams may be received through a channel (e.g., a first channel CH1, a second channel CH2, . . . and/or an $n^{th}$ channel CHn) from the nonvolatile memory device 230.

The controller 210 may be implemented as a circuit such as a field programmable gate array (FPGA) and an application specific integrated circuit (ASIC), or implemented as a combination of a processor and software (e.g., program code) executed by the processor. However, the implementation of the controller 210 is not limited thereto.

The nonvolatile memory device 230 may include nonvolatile memories communicating with the controller 210 through the first channel CH1, nonvolatile memories communicating with the controller 210 through the second channel CH2, and nonvolatile memories communicating with the controller 210 through the $n^{th}$ channel CHn. The number of channels between the nonvolatile memory device 230 and the controller 210 is not limited to that shown in FIG. 1. In addition, the number of nonvolatile memories in the nonvolatile memory device 230 is also not limited to that shown in FIG. 1.

Each of the nonvolatile memories may include nonvolatile memory cells such as NAND flash memory cells, NOR flash memory cells, resistive random access memory (RRAM) cells, ferroelectric random access memory (FRAM) cells, phase change random access memory (PRAM) cells, thyristor random access memory (TRAM) cell, and magnetic random access memory (MRAM) cells, or the like, but is not limited thereto.

The buffer memory 250 may temporarily store a plurality of streams received from the host 100, information about each of the plurality of streams, and data received from the nonvolatile memory device 230. In addition, the buffer memory 250 may temporarily store stream information (e.g., the number of write blocks to be allocated to each of the streams) calculated by the controller 210 in the storage device 200. Data that may be temporarily stored in the buffer memory 250 is not limited thereto. For example, the buffer memory 250 may store metadata such as a mapping table representing relationships between logic block addresses (LBAs) of the host 100 and physical block addresses (PBAs) of the nonvolatile memory device 230. The buffer memory 250 may include volatile memory cells such as a dynamic random access memory (DRAM) cell, a static random access memory (SRAM) cell, and the like. In an example embodiment, the buffer memory may include a different type of memory from the nonvolatile memories included in the nonvolatile memory device 230.

Here, if the number of write blocks to be allocated to the stream is determined statically, the write blocks may not be properly allocated in response to a variable status of the storage device 200, and thus the maximum performance of the storage device 200 may not be achieved.

Accordingly, the storage device 200 according to some example embodiments may dynamically allocate write blocks to a plurality of streams based on real-time information (e.g., a target performance ratio of each stream provided from the host 100, or a table that stores a target performance ratio and target performance of each stream provided from the host 100, and the like) about the streams provided from the host 100. Therefore, it is possible to achieve the maximum performance of the storage device 200. Alternatively, the storage device 200 according to some example embodiments may determine whether write blocks need to be reallocated to a plurality of streams based on real-time information (e.g., a target performance ratio of each stream provided from the host 100, or a table that stores a target performance ratio and target performance of each stream provided from the host 100, data write frequency of write blocks allocated to each of the streams, or the like) about the streams. Further, the storage device 200 according to some example embodiments may calculate the number of write blocks to be allocated to each of the streams and allocate the calculated number of write blocks to each of the streams.

Hereinafter, an operation of dynamically allocating write blocks to each of a plurality of streams provided from the host 100 will be described with reference to FIGS. 1 and 2.

Referring to FIGS. 1 and 2, the controller 210 which exchanges commands (or data) with the host 100 may include a performance request signal receiver 212, a block calculator 214, and/or a block allocator 216.

The performance request signal receiver 212, the block calculator 214, and/or the block allocator 216 within the controller 210 may be implemented as a circuit such as an FPGA and/or an ASIC, or implemented as a combination of a processor and software executed by the processor. However, the configuration of the performance request signal receiver 212, the block calculator 214, and/or the block allocator 216 in the controller 210 is not limited thereto.

The controller 210 in the storage device 200 according to some example embodiments may receive data or commands from the host 100 through the performance request signal receiver 212. In the following description, it is assumed that the controller 210 or the performance request signal receiver 212 receives a plurality of streams included in data or commands delivered from the host 100. FIG. 2 shows that the performance request signal receiver 212 in the controller 210 receives a plurality of streams transmitted from the host 100. However, the performance request signal receiver 212 is not necessarily required in the controller 210 in order to receive the plurality of streams. That is, the controller 210 may directly receive the streams from the host 100. Hereinafter, for simplicity of description, in the communication between the controller 210 and the host 100, it is assumed that the controller 210 and the host 100 communicate directly with each other without using the performance request signal receiver 212.

The block calculator 214 may calculate write blocks to be allocated to the plurality of streams. If the host 100 has transmitted a performance request for each of the streams to the controller 210, the block calculator 214 according to some example embodiments may calculate write blocks that need to be allocated to each of the streams to satisfy the target performance of each of the streams required by the host 100. In this case, the host 100 may transmit, to the controller 210 or to the performance request signal receiver 212, a request for the target performance together with target performance ratio information on a target performance ratio to be occupied by each of the streams in the storage device 200.

Based on the target performance ratio information on the target performance ratio to be occupied by each of the streams in the storage device 200, the controller 210 may calculate the performance that can be achieved by each of the streams. The performance that can be achieved by each of the streams may be, for example, a bandwidth, but is not limited thereto. In the following description, for simplicity of description, the performance that can be achieved by each of the streams is regarded as a bandwidth.

The controller 210 may calculate the performance that can be achieved by each of the streams, and then transfer the calculated performance back to the host 100. The host 100 may determine whether the received performance that can be achieved by each of the streams matches with the target performance of each of the streams required by the host 100. If the received performance is equal to the target performance or has a tolerance within a certain allowable range compared to the target performance, the host 100 may transmit an approval command to the controller 210. When the controller 210 receives the approval command from the host 100, the controller 210 may, by using the block allocator 216, allocate write blocks to each of the streams so that the calculated performance can be achieved for each of the streams. Herein, the allocation of write blocks for each of the streams may be performed by the block allocator 216, but is not limited thereto. That is, the controller 210 may directly allocate the calculated write blocks to each of the streams, without using the block allocator 216.

On the contrary, if the controller 210 does not receive the approval command from the host 100, the controller 210 does not newly allocate the number of write blocks to each of the streams. That is, the storage device 200 or the controller 210 may maintain the number of write blocks currently allocated to each of the streams as it is.

Hereinafter, with reference to a flowchart of FIG. 3, there will be described an operation of the storage device 200 according to some example embodiments dynamically allocating write blocks to a plurality of streams provided from the host 100 to achieve the maximum performance of the storage device 200.

Figure 3:
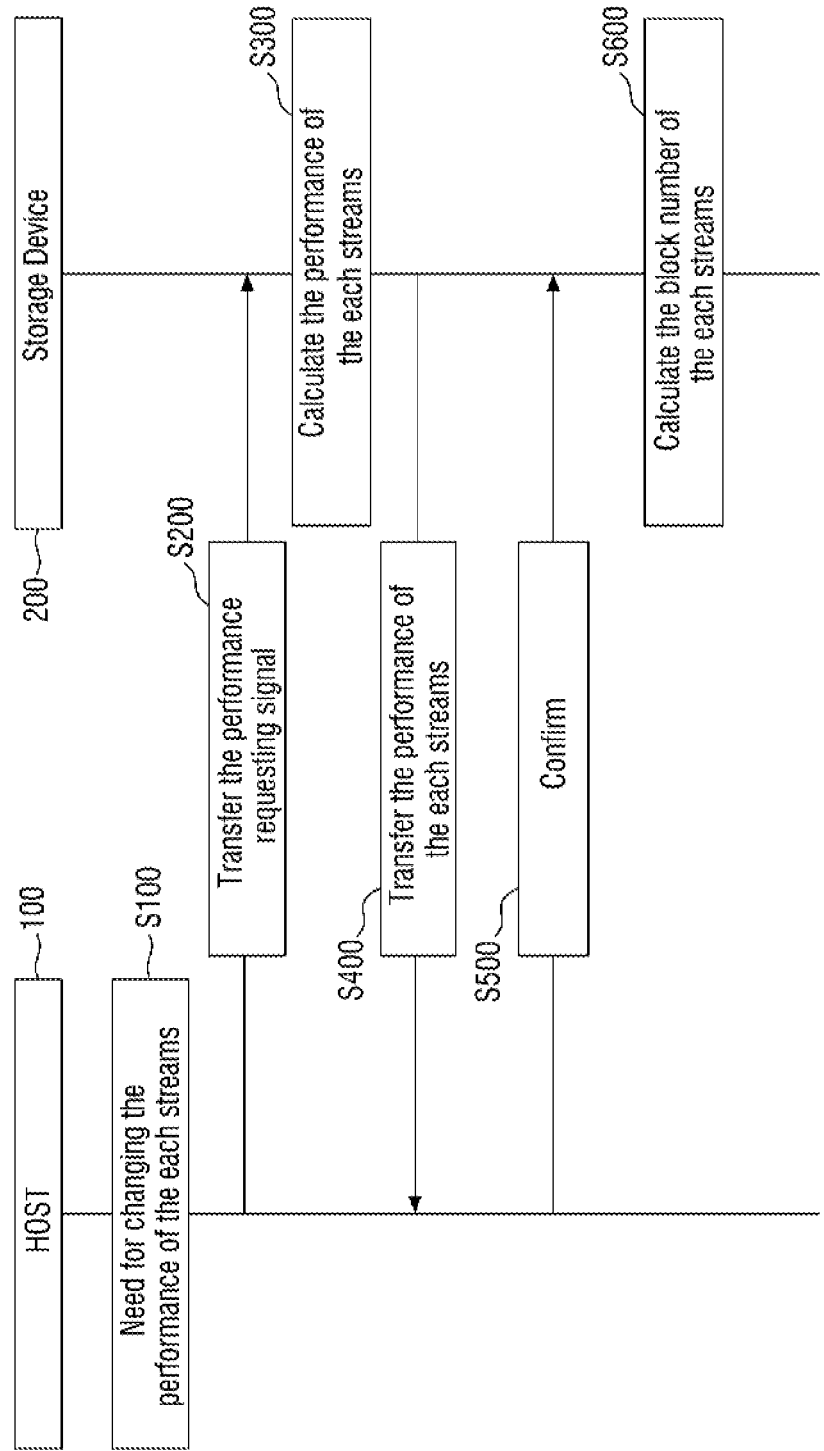
FIG. 3 is a flowchart describing an operating method of a storage system, according to some example embodiments.
Figure 5:
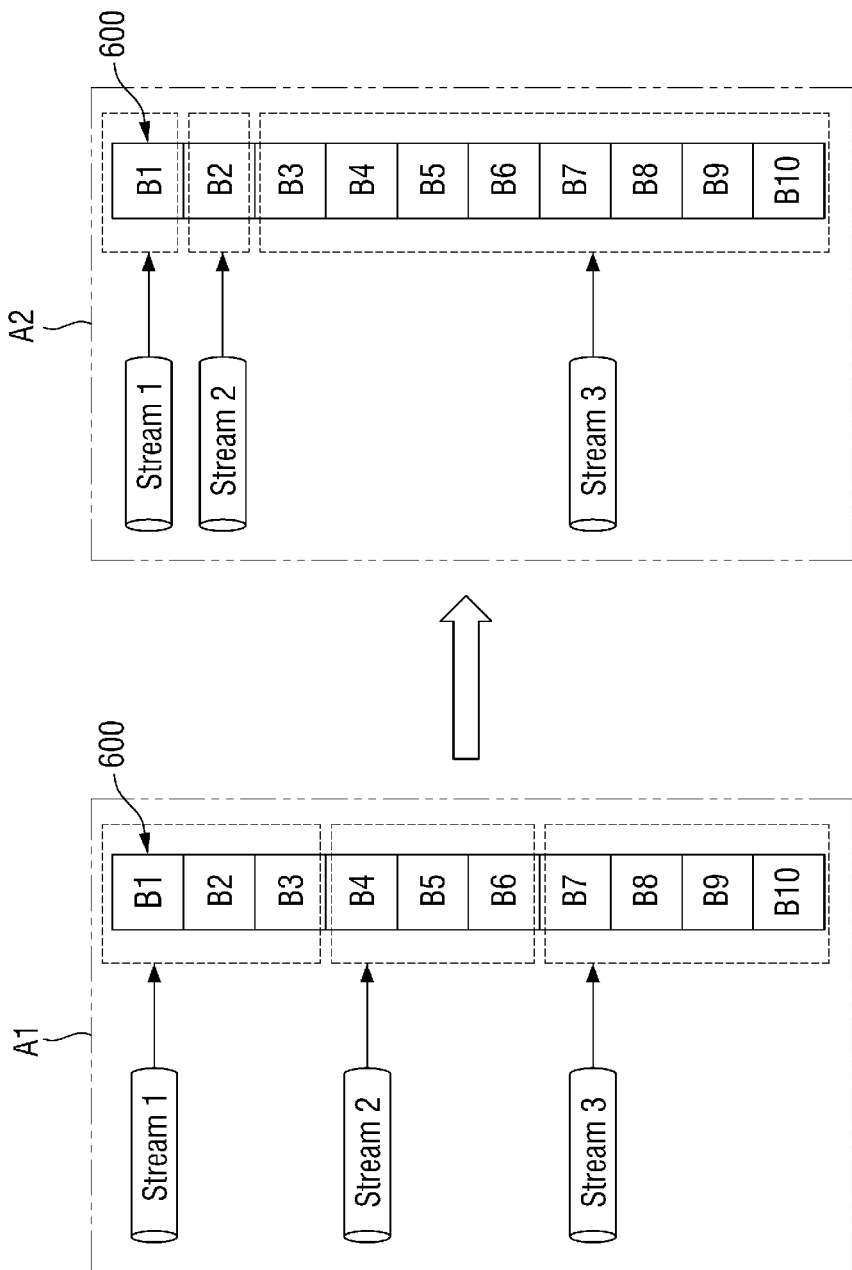
FIG. 5 is a block diagram illustrating dynamic allocation of write blocks for each stream, according to some example embodiments.

FIG. 3 is a flowchart describing an operating method of a storage system, according to some example embodiments. FIG. 4 is a table describing information about each of a plurality of streams, according to some example embodiments. FIG. 5 is a block diagram explaining dynamic allocation of write blocks for each stream, according to some example embodiments.

Referring to FIGS. 1 to 3, the host 100 may determine that a performance of each of a plurality of streams needs to be changed (operation S100).

In order to change the performance of each of the streams, the host 100 may transmit to the storage device 200 a request signal containing target performance ratio information on the target performance ratio to be occupied by each of the streams in the storage device 200 (operation S200). The target performance ratio, transmitted from the host 100 to the controller 210, that each of the streams occupies in the storage device 200 may be the same as a performance ratio 300 of each stream in a first table of FIG. 4.

Referring to FIG. 4, the host 100 may transmit to the controller 210 information on the target performance ratio to be occupied by each of the streams in the storage device 200, i.e., the performance ratio 300 of each stream.

For example, in the first table (Table 1), the host 100 may transmit to the controller 210 the target performance ratio information on the target performance ratio to be occupied by each of the streams (Stream 1, Stream 2, and Stream 3) in the storage device 200, that is, information indicating that the performance ratio 300 is 10% for the first stream, 10% for the second stream, and 80% for the third stream.

The performance ratio 300 of each stream has been described only for the ratio between the first stream (Stream 1), the second stream (Stream 2), and the third stream (Stream 3) in FIG. 4. However, the performance ratio 300 of each stream according to some example embodiments is not limited thereto and may be a target performance ratio between more or fewer streams. In addition, the performance ratio 300 for each of the streams (Stream 1, Stream 2, and Stream 3) described in the first table (Table 1) of FIG. 4 is merely an example and may not be limited to the numbers written in the first table (Table 1).

Referring back to FIGS. 1 to 3, the controller 210 may calculate the performance that can be achieved by each of the streams by referring to the target performance ratio of each stream received from the host 100 (operation S300). The controller 210 may calculate the performance that can be achieved by each of the streams and transfer the calculated value to the host 100 (operation S400). The performance calculated by the controller 210, which can be achieved by each of the streams, may be the same as performance 400 of each stream in the first table (Table 1) of FIG. 4.

Referring back to FIG. 4, based on the information (e.g., the performance ratio 300 of each stream) received from the host 100, the controller 210 may calculate the performance of each of the streams (Stream 1, Stream 2, and Stream 3).

For example, it is assumed that the controller 210 calculates the performance 400 that can be possessed by each of the streams so as to satisfy the performance ratio 300 being 10% for the first stream (Stream 1), 10% for the second stream (Stream 2), and 80% for the third stream (Stream 3). In this case, the performance 400 of each stream calculated by the controller 210 may be obtained such that a bandwidth of the first stream (Stream 1) is 100 MB/s, a bandwidth of the second stream (Stream 2) is 100 MB/s, and a bandwidth of the third stream (Stream 3) is 800 MB/s.

The performance 400 of each stream of FIG. 4 has been described only for performance for the first stream (Stream 1), the second stream (Stream 2), and the third stream (Stream 3). However, the performance 400 of each stream according to some example embodiments is not limited thereto, and may be performance for more or fewer streams. In addition, the performance 400 for each of the streams (Stream 1, Stream 2, and Stream 3) described in Table 1 of FIG. 4 is merely an example and may not be limited to the numbers written in the first table (Table 1).

Referring back to FIGS. 1 to 3, the host 100 may check the performance of each of the streams calculated and transmitted from the storage device 200 to ensure that the calculated performance of each of the streams corresponds to the target performance of each of the streams required by the host 100 in operation S100. If the target performance of each of the streams (Stream 1, Stream 2, and Stream 3) required in operation S100 is equal to the performance of each of the streams calculated and transmitted from the storage device 200 in operation S400 or has a tolerance within a certain allowable range compared to the performance of each of the streams calculated transmitted from the storage device 200 in operation S400, the host 100 may transmit an approval command to the storage device 200 (operation S500).

When the storage device 200 receives the approval command from the host 100, the storage device 200 may reallocate the number of write blocks currently allocated to each of the streams. If the storage device 200 does not receive the approval command from the host 100, the storage device 200 maintains the number of write blocks currently allocated to each of the streams as it is. The number of write blocks for each of the streams after the storage device 200 receives the approval command from the host 100 may be set as shown in a block number 500 of FIG. 4.

Referring again to FIG. 4, the storage device 200 that has received the approval command from the host 100 may change the number of write blocks for each of the streams (Stream 1, Stream 2, and Stream 3).

For example, the number of write blocks to be allocated to the first stream (Stream 1) may be 1, the number of write blocks to be allocated to the second stream (Stream 2) may be 1, and the number of write blocks to be allocated to the third stream (Stream 3) may be 8.

The number of the write blocks that are allocated to each of the streams (Stream 1, Stream 2, and Stream 3) in order to satisfy the performance 400 of each of the streams (Stream 1, Stream 2, and Stream 3) is not limited to the example embodiment shown in FIG. 4. For example, the number of write blocks allocated to the first stream (Stream 1) may be 2, the number of write blocks allocated to the second stream (Stream 2) may be 2, and the number of write blocks allocated to the third stream (Stream 3) may be 16. In other words, the number of write blocks allocated to each of the streams is not limited as long as the write blocks are allocated to each of the streams such that the performance of each of the streams calculated based on the performance 400 of each stream is achieved. An operation of reallocating write blocks to each of the streams (Stream 1, Stream 2, and Stream 3) to satisfy the performance 400 of each of the streams (Stream 1, Stream 2, and Stream 3) will be described in more detail with reference to FIG. 5.

Referring to FIGS. 1 to 5, at a time point when the host 100 determines that the performance of each of a plurality of streams needs to be changed in operation S100 in FIG. 3, write blocks allocated to each of the streams may be illustrated as shown in A1. Although the number of write blocks 600 has been illustrated as a total of 10 (B1 to B10) in FIG. 5, the number of the write blocks 600 is not limited to this example. For example, in the case of A1 where reallocation of write blocks to each of the streams has not been performed, the total number of write blocks allocated to the first stream (Stream 1) may be 3 (B1, B2, and B3), the total number of write blocks allocated to the second stream (Stream 2) may be 3 (B4, B5, and B6), and the total number of write blocks allocated to the third stream (Stream 3) may be 4 (B7, B8, B9, and B10).

The allocation of write blocks in the case of A1 before the reallocation of write blocks is performed for each of the streams is not limited to the example of FIG. 5.

Thereafter, in the case that the host 100 transmits an approval command to the storage device 200 with respect to the performance 400 of each stream calculated by the storage device 200 based on the performance ratio 300 of each stream received from the host 100, the storage device 200 may allocate the number of write blocks to each of the streams as shown in the block number 500 of the first table. For example, when the storage device 200 receives the approval command from the host 100, the storage device 200 may allocate one write block (B1) to the first stream (Stream 1). Further, the storage device 200 may allocate another write block (B2) to the second stream (Stream 2). Furthermore, the storage device 200 may allocate the remaining eight write blocks (B3 to B10) to the third stream (Stream 3).

That is, after the storage device 200 receives the approval command from the host 100, the storage device 200 reallocates the number of write blocks allocated to each of the streams (Stream 1, Stream 2, and Stream 3). Therefore, the write blocks may be reallocated to each of the streams (Stream 1, Stream 2, and Stream 3) as shown in the case of A2 in FIG. 5.

In the above operations, while it has been described that the storage device 200 performs the allocation of write blocks, the controller 210 of the storage device 200 may perform the allocation of write blocks. Further, the block allocator 216 of the controller 210 may perform the allocation of write blocks. While it has been described that the storage device 200 calculates the number of write blocks to be allocated to each of the streams (Stream 1, Stream 2, and Stream 3), but the controller 210 or the block calculator 214 may calculate the number of write blocks to be allocated to each of the streams.

The first table (Table 1) that contains information about the performance ratio 300 of each stream transferred from the host 100 to the storage device 200, the performance 400 of each stream calculated by the storage device 200, and the block number 500 corresponding to the number of write blocks of each stream calculated by the storage device 200 may be stored in different locations according to some example embodiments. At a time point when the write blocks need to be reallocated, the storage device 200 (or the controller 210, or the block calculator 214) retrieves the first table (Table 1) stored in different locations according to some example embodiments. The operation of loading the first table (Table 1) by the block calculator 214 will be described in detail with reference to FIGS. 6 to 8.

Figure 6:
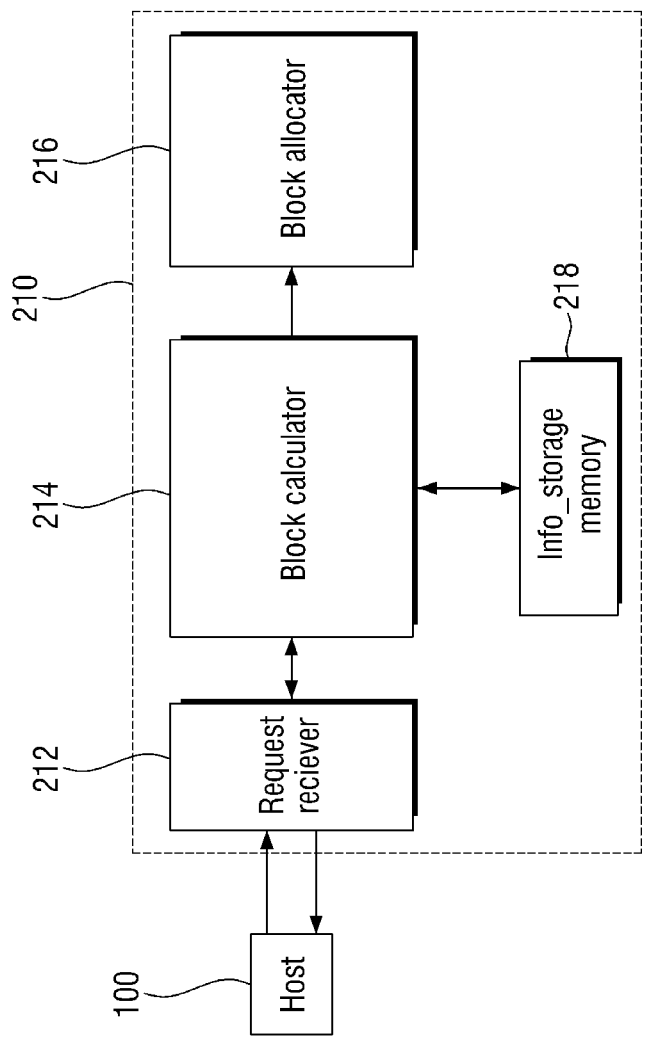
FIGS. 6, 7, and 8 are block diagrams describing an operation of transmitting and receiving a table of FIG. 4 in a storage device according to some example embodiments.
Figure 7:
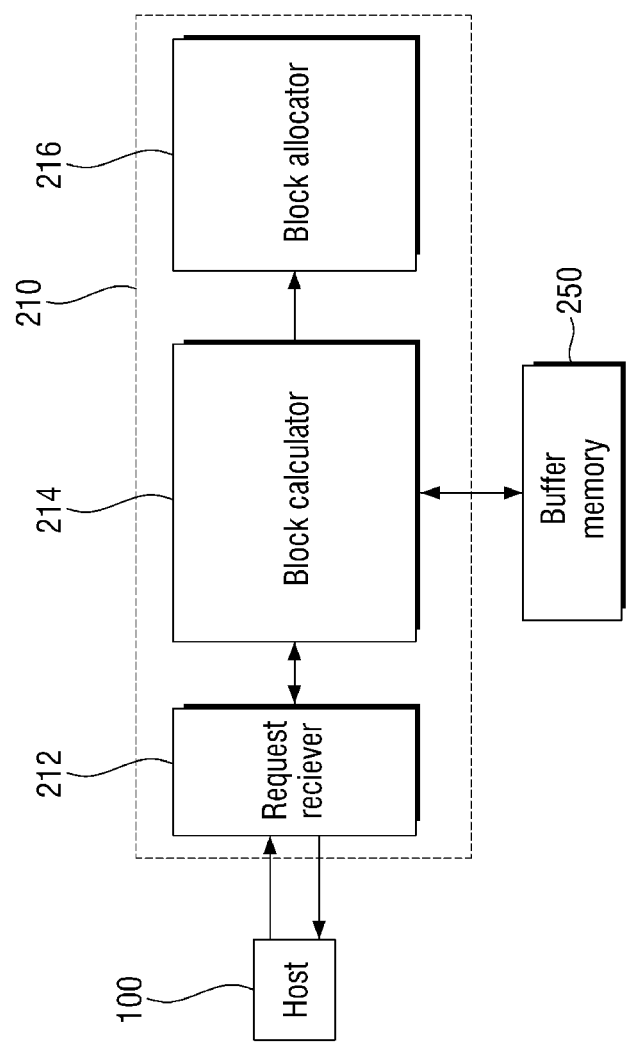
Figure 8:
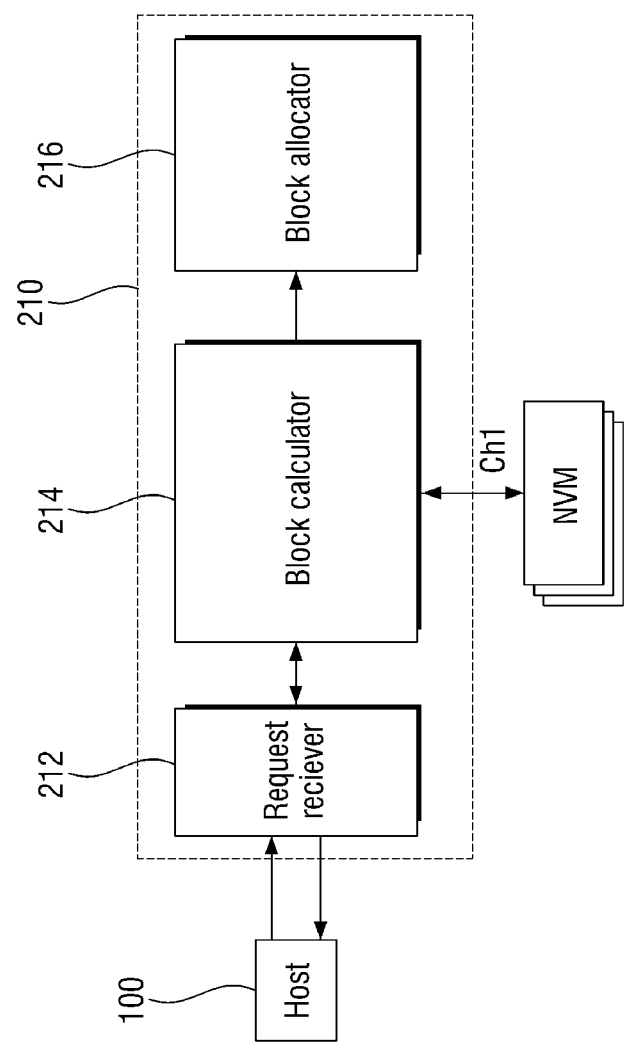

FIGS. 6 to 8 are block diagrams describing an operation of transmitting and receiving a table of FIG. 4 in a storage device according to some example embodiments.

Referring to FIGS. 1 to 6, the controller 210 may further include an information storage memory 218. The information storage memory 218 may include a volatile memory cell such as a DRAM cell, an SRAM cell, and the like.

After the block calculator 214 calculates the number of write blocks to be allocated to each of the streams (Stream 1, Stream 2, and Stream 3), the information storage memory 218 may receive and store the first table (Table 1) from the block calculator 214. Further, after the block calculator 214 calculates the performance 400 of each of the streams (Stream 1, Stream 2, and Stream 3), the information storage memory 218 may receive and store information on the performance ratio 300 of each stream and the performance 400 of each stream from the block calculator 214. Furthermore, the information storage memory 218 may directly receive and store information on the performance ratio 300 of each stream which has been transferred from the host 100 to the block calculator 214.

Therefore, the block calculator 214 may read information on the performance ratio 300 of each stream from the information storage memory 218 to calculate the performance 400 of each stream. Further, the block calculator 214 may read the performance 400 of each stream from the information storage memory 218 to calculate the number of write blocks to be allocated to each of the streams (Stream 1, Stream 2, and Stream 3).

Referring to FIGS. 1 to 7, the controller 210 may communicate with the buffer memory 250 in the storage device 200. The buffer memory 250 may include a volatile memory cell such as a DRAM cell, an SRAM cell and the like.

After the block calculator 214 calculates the number of write blocks to be allocated to each of the streams (Stream 1, Stream 2, and Stream 3), the buffer memory 250 may receive and store the first table (Table 1) from the block calculator 214. Further, after the block calculator 214 calculates the performance 400 of each of the streams (Stream 1, Stream 2, and Stream 3), the buffer memory 250 may receive and store information on the performance ratio 300 of each stream and the performance 400 of each stream from the block calculator 214. Furthermore, the buffer memory 250 may directly receive and store information on the performance ratio 300 of each stream which has been transferred from the host 100 to the block calculator 214. Therefore, the block calculator 214 may read information on the performance ratio 300 of each stream from the buffer memory 250 to calculate the performance 400 of each stream. Further, the block calculator 214 may read the performance 400 of each stream from the buffer memory 250 to calculate the number of write blocks to be allocated to each of the streams (Stream 1, Stream 2, and Stream 3).

Referring to FIGS. 1 to 8, the controller 210 may communicate with nonvolatile memories NVM in the storage device 200 through a first channel CH1. Each of the nonvolatile memories NVM may include, but is not limited to, a nonvolatile memory cell such as a NAND flash memory cell, a NOR flash memory cell, an RRAM cell, an FRAM cell, a PRAM cell, a TRAM cell, an MRAM cell, and the like.

In addition, FIG. 8 illustrates that the controller 210 and the nonvolatile memories NVM communicate with each other through the first channel CH1, but the channel through which the controller 210 and the nonvolatile memories NVM communicate with each other is not limited thereto.

After the block calculator 214 calculates the number of write blocks to be allocated to each of the streams (Stream 1, Stream 2, and Stream 3), the nonvolatile memories NVM may receive and store the first table (Table 1) from the block calculator 214. Further, after the block calculator 214 calculates the performance 400 of each of the streams (Stream 1, Stream 2, and Stream 3), the nonvolatile memories NVM may receive and store information on the performance ratio 300 of each stream and the performance 400 of each stream from the block calculator 214. Furthermore, the nonvolatile memories NVM may directly receive and store information on the performance ratio 300 of each stream which has been transferred from the host 100 to the block calculator 214. Therefore, the block calculator 214 may read information on the performance ratio 300 of each stream from the nonvolatile memories NVM to calculate the performance 400 of each stream. Further, the block calculator 214 may read the performance 400 of each stream from the nonvolatile memories NVM to calculate the number of write blocks to be allocated to each of the streams (Stream 1, Stream 2, and Stream 3).

Unlike the method of operating the storage system in FIG. 3 according to some example embodiments, when the host determine that a performance of each of a plurality of streams needs to be changed, a table (as shown in the first table of FIG. 4) containing information about the target performance ratio, target performance, and the number of write blocks to be allocated for each of the streams may be transferred to the storage device 200. In this case, the storage device may compare the existing table with a table that has been lastly transmitted from the host and may determine whether to modify or maintain the existing table. A detailed operating method thereof will be described with reference to FIGS. 9 and 10.

FIG. 9 is a table describing information on each of a plurality of streams according to some different example embodiments from FIG. 4.

Referring to FIGS. 1 to 9, when the host determine that a performance of each of a plurality of streams needs to be changed, a second table (Table 2) containing information about a performance ratio 310 corresponding to a target performance ratio, a performance 410 corresponding to target performance, and the number of write blocks 510 to be allocated for each of the streams may be transferred to the storage device 200. Then, the storage device 200 (or the controller 210, or the block calculator 214) may read the first table (Table 1) stored in the buffer memory 250, the nonvolatile memories NVM, or the information storage memory 218 to compare the first table (Table 1) with the second table (Table 2). The storage device 200 transmits the comparison result based on whether the first table (Table 1) and the second table (Table 2) are different from each other (i.e., a determination that the first table (Table 1) and the second table (Table 2) are the same or a determination that the first table (Table 1) and the second table (Table 2) are different from each other) to the host 100. Then, the host 100 may or may not transmit an approval command with respect to the comparison result received from the storage device 200.

The host 100 may issue an approval command to the storage device 200 when the host 100 determines that the first table (Table 1) and the second table (Table 2) are different from each other. However, the disclosure is not limited thereto, and if the first table (Table 1) and the second table (Table 2) are different from each other, if the host 100 determines that their difference is within an allowable error range, the host 100 may not transmit the approval command to the storage device 200.

In addition, when the first table (Table 1) and the second table (Table 2) are the same, the host 100 may not transmit the approval command to the storage device 200. However, the disclosure is not limited thereto, and if it is determined that the second table (Table 2) needs to be updated, the host 100 may transmit the approval command to the storage device 200 despite the comparison result.

When the storage device 200 receives the approval command from the host 100, the storage device 200 (or the controller 210, or the block calculator 214) may update the first table (Table 1) stored in the buffer memory 250, the nonvolatile memories (NVM), or the information storage memory 218 to the second table (Table 2). Alternatively, after receiving the approval command from the host 100, the storage device 200 (or the controller 210, or the block calculator 214) may calculate the performance 410 of each stream and the write blocks 510 of each stream once again based on the performance ratio 310 of each stream to complete the second table (Table 2). For example, in the second table (Table 2) containing the target performance ratio information required by the host 100 on the target performance ratio to be occupied by each of the streams (Stream 1, Stream 2, and Stream 3) in the storage device 200, the first stream (Stream 1) may occupy 10%, the second stream (Stream 2) may occupy 50%, and the third stream (Stream 3) may occupy 40% in the storage device 200. That is, the performance ratio 310 of each stream may be recorded as shown in the first row of the second table (Table 2).

Based on the performance ratio 310 of each stream, the storage device 200 (or the controller 210, or the block calculator 214) may calculate the performance of each of the streams (Stream 1, Stream 2, and Stream 3). For example, the calculated performance of the first stream (Stream 1) may be 100 MB/s, the calculated performance of the second stream (Stream 2) may be 500 MB/s, and the calculated performance of the third stream (Stream 3) may be 400 MB/s. This may be recorded as the performance 410 shown in the second row of the second table (Table 2).

Further, the storage device 200 (or the controller 210, or the block calculator 214) may calculate the number of write blocks to be allocated to each of the streams (Stream 1, Stream 2, and Stream 3) based on the performance 410 of each stream. For example, the number of write blocks to be allocated to the first stream (Stream 1) may be calculated as one, the number of write blocks to be allocated to the second stream (Stream 2) may be calculated as five, and the number of write blocks to be allocated to the third stream (Stream 3) may be calculated as four. This may be recorded as the write blocks 510 shown in the third row of the second table (Table 2).

Thereafter, the storage device 200 (or the controller 210, or the block calculator 214) may allocate the write blocks to each of the streams according to the number of the write blocks 510 recorded in the second table (Table 2).

An operating method of a storage system of reallocating write blocks to each of a plurality of streams by comparing different tables according to some example embodiments will be described with reference to FIG. 10.

Figure 10:
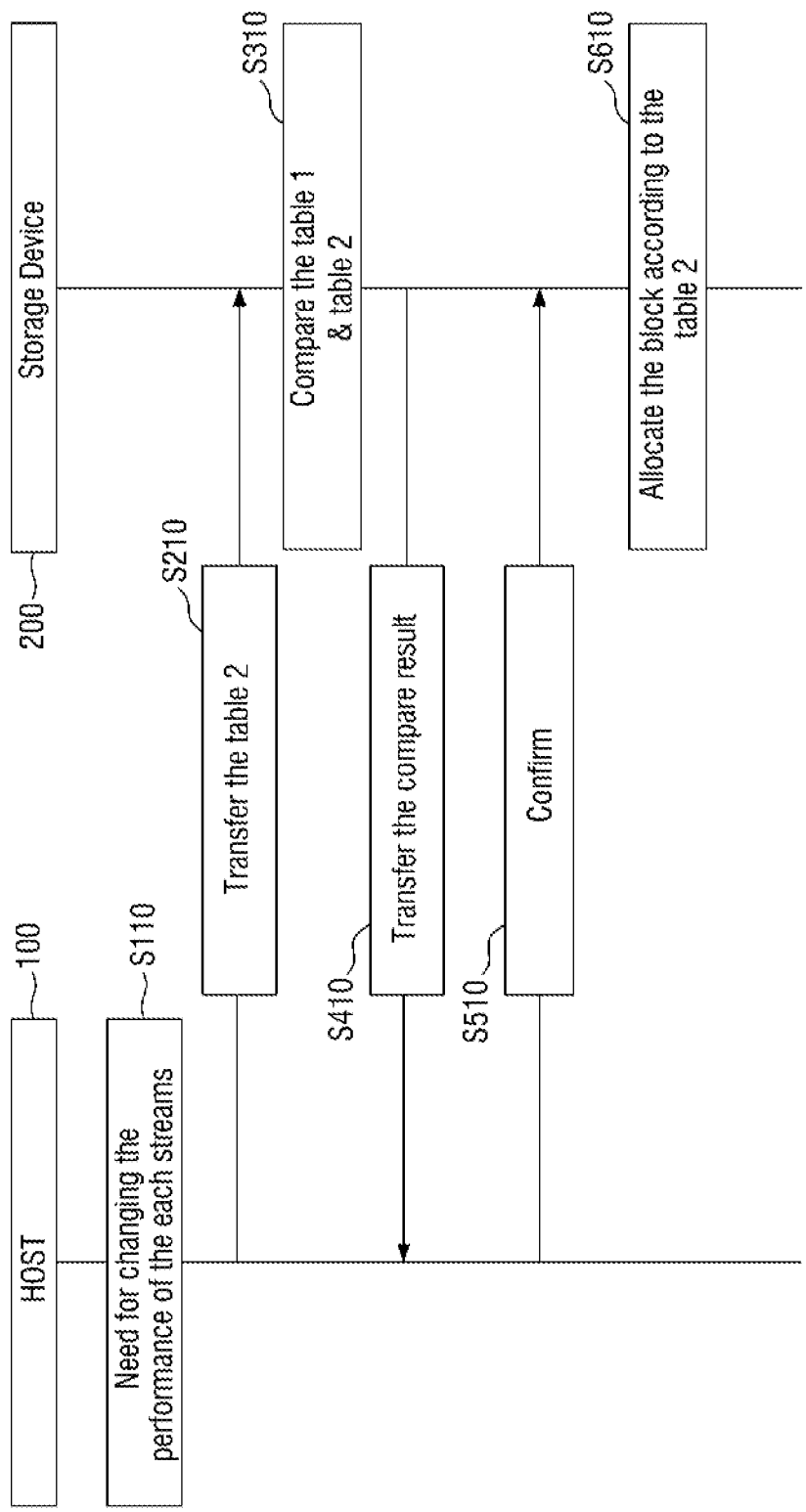
FIG. 10 is a flowchart describing an operating method of a storage system, according to some example embodiments.

FIG. 10 is a flowchart describing an operating method of a storage system, according to some other example embodiments from FIG. 3. For simplicity of description, a description overlapping with the above description is omitted.

Referring to FIGS. 1 to 10, the host 100 may determine that a performance of each of a plurality of streams needs to be changed (operation S110). Then, the host 100 may transmit to the storage device 200 the second table (Table 2) containing information about the performance ratio 310, the performance 410, and the number of write blocks 510 for each of the streams (operation S210).

The storage device 200 may read the first table (Table 1) stored in the buffer memory 250, the nonvolatile memories NVM, or the information storage memory 218 to compare the first table (Table 1) with the second table (Table 2) transmitted from the host 100 (operation S310).

The storage device 200 may transfer the comparison result of operation S310 to the host 100 (operation S410). The host 100 may determine whether to update the first table (Table 1) to the second table (Table 2) based on the comparison result received from the storage device 200, and when it is determined to update the first table (Table 1) to the second table (Table 2), the host may transmit an approval command to the storage device 200 (operation S510).

The storage device 200 having received the approval command may allocate write blocks to each of the streams according to the number of write blocks 510 recorded in the second table (Table 2) (operation S610).

The operating methods of the storage system according to some example embodiments described above require communication between the host and the storage device. Hereinafter, according to some example embodiments, descriptions will be made regarding an operating method of a storage system in which the storage device determines a need for adjusting the number of write blocks to be allocated to each of a plurality of streams, and the storage device itself reallocates write blocks to each of the plurality of streams.

Figure 11:
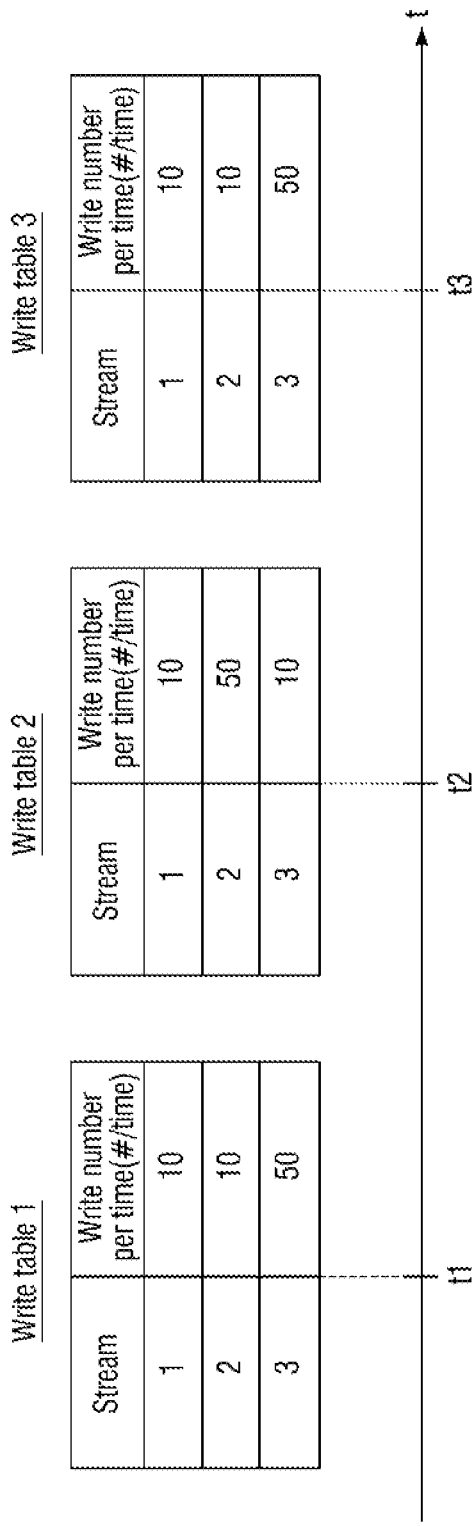
FIG. 11 is a diagram describing an operation of updating over time a write count table which stores a write frequency for each of a plurality of streams according to some example embodiments.
Figure 12:
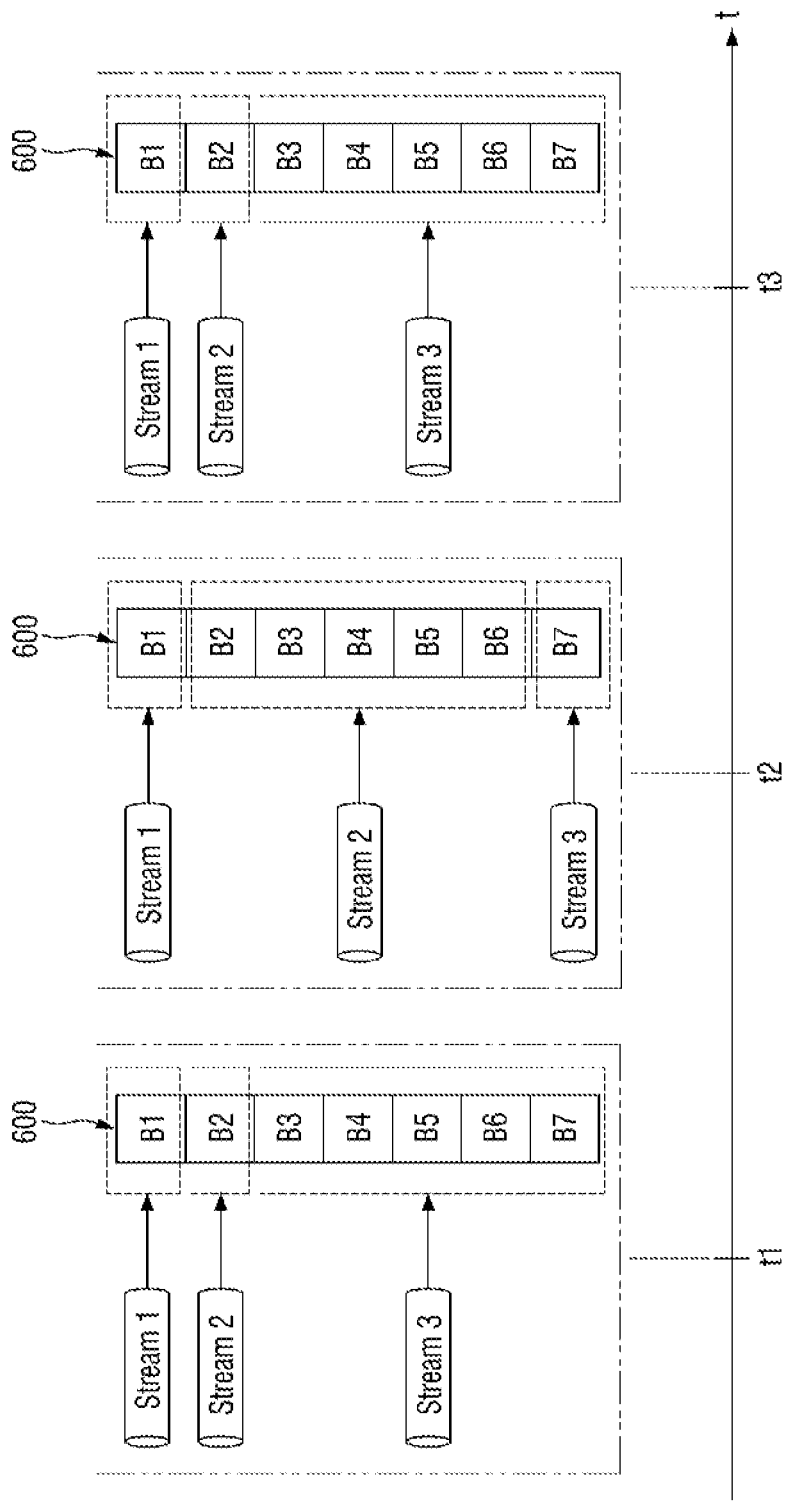
FIG. 12 is a diagram describing a dynamic change in a number of write blocks allocated to each of a plurality of streams as the write count table is updated, according to some example embodiments.

FIG. 11 is a diagram describing an operation of updating over time a write count table which stores a write frequency for each of a plurality of streams according to some example embodiments. FIG. 12 is a diagram describing a dynamic change in the number of write blocks allocated to each of a plurality of streams as the write count table is updated, according to some example embodiments.

Referring to FIGS. 1 to 12, the controller 210 may generate a write count table which stores write frequency information containing the number of times per predetermined time period that data is written into the write blocks allocated to each of the streams (Stream 1, Stream 2, and Stream 3). For example, as shown in FIG. 12, the controller 210 may generate a first write count table (Write table 1) corresponding to a first time point t1, a second write count table (Write table 2) corresponding to a second time point t2, and a third write count table (Write table 3) corresponding to a third time point t3.

FIG. 11 illustrates only three write count tables for the first time point t1, the second time point t2, and the third time point t3, but the number of write count tables that can be generated by the controller 210 is not limited thereto.

The controller 210 may store and update the plurality of write count tables (e.g., the first write count table (Write table 1), the second write count table (Write table 2), and/or the third write count table (Write table 3)) generated at each time point in the buffer memory 250, the information storage memory 218, and/or the nonvolatile memories NVM. Hereinafter, for simplicity of description, it will be described that the controller 210 stores and reads the write count tables in and from the buffer memory 250, but the location where the write count tables are stored and read is not limited to the buffer memory 250.

In detail, the controller 210 may determine, at the first time point t1, that data is written 10 times per predetermined time period in write blocks allocated to the first stream (Stream 1), and may record the same. Further, the controller 210 may determine, at the first time point t1, that data is written 10 times per predetermined time period in write blocks allocated to the second stream (Stream 2), and record the same. Furthermore, the controller 210 may determine, at the first time point t1, that data is written 50 times per predetermined time period in write blocks allocated to the third stream (Stream 3), and record the same.

The controller 210 may store, in the buffer memory 250, the first write count table (Write table 1) containing the number of times per predetermined time period that data is written into the write blocks allocated to the streams (Stream 1, Stream 2, and Stream 3) at the first time point t1. Immediately after recording or at a certain time point after storing the first write count table (Write table 1) in the buffer memory 250, the controller 210 may determine, based on the first write count table (Write table 1), if it is required to reallocate the number of write blocks allocated to each of the streams (Stream 1, Stream 2, and Stream 3). If it is determined based on the first write count table (Write table 1) of the first time point t1 that the reallocation of the write blocks allocated to each of the streams (Stream 1, Stream 2, and Stream 3) is needed, the controller 210 may calculate the number of write blocks to be allocated to each of the streams (Stream 1, Stream 2, and Stream 3) by using the block calculator 214.

Thereafter, the controller 210 may allocate the calculated write blocks to each of the streams (Stream 1, Stream 2, and Stream 3) by itself or by using the block calculator 214. Hereinafter, for simplicity of description, it is described that the controller 210 calculates the number of write blocks to be allocated to each of the streams and allocates write blocks to each of the streams according to the calculated number of write blocks. For example, it is assumed that the controller 210 determines, based on the first write count table (Write table 1) at the first time point t1, that the reallocation of write blocks allocated to each of the streams (Stream 1, Stream 2, and Stream 3) is needed. The controller 210 may calculate that one write block for the first stream (Stream 1), one write block for the second stream (Stream 2), and five write blocks for the third stream (Stream 3) are required. Thereafter, the controller 210 may reallocate the write blocks 600 to each of the streams (Stream 1, Stream 2, and Stream 3) based on a calculation result. That is, the controller 210 may reallocate one write block B1 to the first stream (Stream 1), one write block B2 to the second stream (Stream 2), and five write blocks B3~B7 to the third stream (Stream 3) at the first time point t1.

The controller 210 may store, in the buffer memory 250, the second write count table (Write table 2) containing the number of times per predetermined time period that data is written into the write blocks allocated to the streams (Stream 1, Stream 2, and Stream 3) at the second time point t2. Immediately after recording or at a certain time point after storing the second write count table (Write table 2) in the buffer memory 250, the controller 210 may determine, based on the second write count table (Write table 2), if it is required to reallocate the number of write blocks allocated to each of the streams (Stream 1, Stream 2, and Stream 3). If it is determined, by comparing the second write count table (Write table 2) of the second time point t2 with the first write count table (Write table 1), that the reallocation of the write blocks allocated to each of the streams (Stream 1, Stream 2, and Stream 3) is needed, the controller 210 may calculate the number of write blocks to be allocated to each of the streams (Stream 1, Stream 2, and Stream 3) by using the block calculator 214.

Thereafter, the controller 210 may allocate the calculated write blocks to each of the streams (Stream 1, Stream 2, and Stream 3) by itself or by using the block calculator 214. For example, it is assumed that the controller 210 determines, based on the comparison between the first write count table (Write table 1) and the second write count table (Write table 2) at the second time point t2, that the reallocation of the write blocks allocated to each of the streams (Stream 1, Stream 2, and Stream 3) is needed. The controller 210 may calculate that one write block for the first stream (Stream 1), five write blocks for the second stream (Stream 2), and one write block for the third stream (Stream 3) are required. Thereafter, the controller 210 may reallocate the write blocks 600 to each of the streams (Stream 1, Stream 2, and Stream 3) based on a calculation result. That is, the controller 210 may allocate one write block B1 to the first stream (Stream 1), five write blocks B2~B6 to the second stream (Stream 2), and one write block B7 to the third stream (Stream 3) at the second time point t2.

The controller 210 may store, in the buffer memory 250, the third write count table (Write table 3) containing the number of times per predetermined time period that data is written into the write blocks allocated to the streams (Stream 1, Stream 2, and Stream 3) at the third time point t3. Immediately after recording or at a certain time point after storing the third write count table (Write table 3) in the buffer memory 250, the controller 210 may determine, based on the third write count table (Write table 3), if it is required to reallocate the number of write blocks allocated to each of the streams (Stream 1, Stream 2, and Stream 3). If it is determined, by comparing the third write count table (Write table 3) of the third time point t3 to the second write count table (Write table 2), that the reallocation of the write blocks allocated to each of the streams (Stream 1, Stream 2, and Stream 3) is needed, the controller 210 may calculate the number of write blocks to be allocated to each of the streams (Stream 1, Stream 2, and Stream 3) by using the block calculator 214.

Thereafter, the controller 210 may allocate the calculated write blocks to each of the streams (Stream 1, Stream 2, and Stream 3) by itself or by using the block calculator 214. For example, it is assumed that the controller 210 determines, based on the comparison between the second write count table (Write table 2) and the third write count table (Write table 3) at the third time point t3, that the reallocation of the write blocks allocated to each of the streams (Stream 1, Stream 2, and Stream 3) is needed. The controller 210 may calculate that one write block for the first stream (Stream 1), one write block for the second stream (Stream 2), and five write blocks for the third stream (Stream 3) are required. Thereafter, the controller 210 may reallocate the write blocks 600 to each of the streams (Stream 1, Stream 2, and Stream 3) based on a calculation result. That is, the controller 210 may allocate one write block B1 to the first stream (Stream 1), one write block B2 to the second stream (Stream 2), and five write blocks B3~B7 to the third stream (Stream 3) at the third time point t3.

Figure 13:
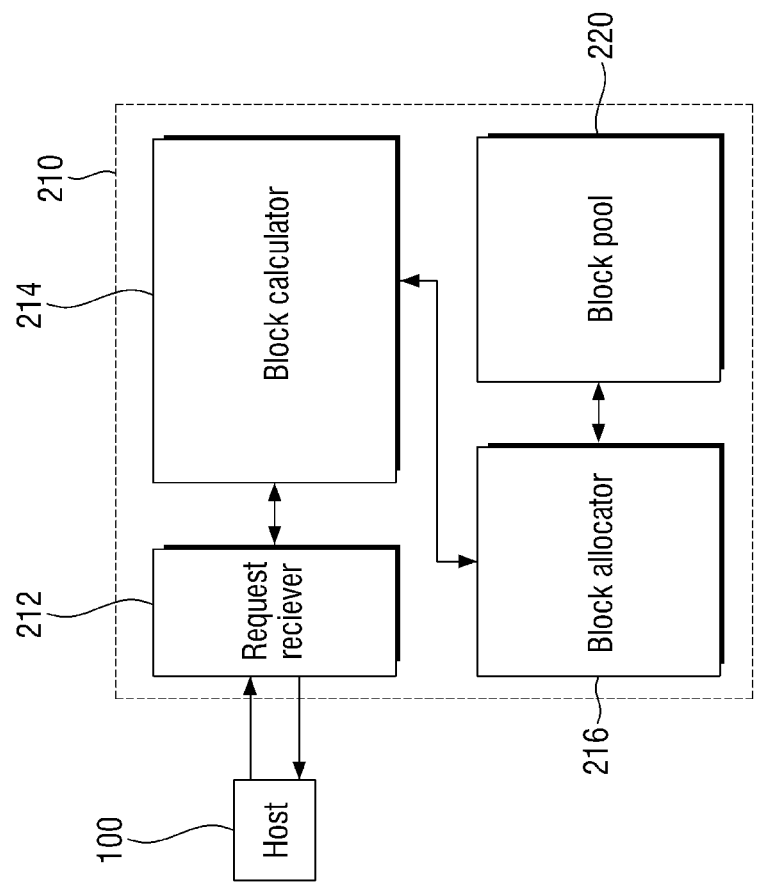
FIG. 13 is a block diagram describing a storage system, according to some example embodiments.
Figure 14:
FIG. 14 is a diagram describing a block table including information on whether each of a plurality of streams is activated and write block information on write blocks allocated to each of the plurality of streams, according to some example embodiments.
Figure 15:
FIG. 15 is a diagram describing a block table updated by dynamically allocating write blocks to an activated stream based on the block table of FIG. 14 according to some example embodiment.

FIG. 13 is a block diagram describing a storage system, according to some example embodiments. FIG. 14 is a diagram describing a block table including information on whether each of a plurality of streams is activated and write block information on write blocks allocated to each of the plurality of streams, according to some example embodiments. FIG. 15 is a diagram describing a block table updated by dynamically allocating write blocks to an activated stream based on the block table of FIG. 14.

Referring to FIGS. 13 to 15, in comparison to FIG. 2, the controller 210 of the storage device according to some example embodiments may further include a block pool 220.

A certain number of write blocks may be allocated to each of a plurality of streams in the storage system according to some example embodiments. There may be a case where all the streams are in an activated state. On the other hand, there may be a case where only some of the streams are in an activated state. In other words, when a certain number of write blocks are already allocated to each of the plurality of streams, write blocks of some inactivated streams among the plurality of streams may exist in an unused state. Accordingly, in order to maximize performance on one or more currently activated streams, write blocks allocated to streams that are not currently activated may be reallocated to the one or more currently activated streams, thereby improving the performance of the entire storage system according to some example embodiments.

In order to determine whether each of the streams is activated, the controller 210 of the storage system according to some example embodiments may store a block table that contains information on write blocks allocated to each of the streams and information on whether each of the streams is activated. Here, the block table may be stored in a separate block pool 220 included in the controller 210. The block pool 220 may include a volatile memory cell such as a DRAM cell, an SRAM cell, and the like, but is not limited thereto.

The block pool 220 may receive allocation information from the controller 210 or the block allocator 216 after the write blocks are allocated to each of the streams. That is, the block pool 220 may include information of the write blocks that are allocated to each of the streams (Stream 1, Stream 2, and Stream 3), as shown in the block table of FIG. 14. Further, in the block table, activated write blocks (e.g., B0~B4) may be distinguished from inactivated write blocks (e.g., B5~B7). In FIG. 14, a value of 1 is assigned to the activated write blocks (e.g., B0~B4) and a value of 0 is assigned to the inactivated write blocks (e.g., B5~B7), but a method of distinguishing between the activated write blocks and the inactivated write blocks is not limited thereto. Furthermore, in the block table, activated streams among the plurality of streams may be distinguished and identified as being active. In the block table of FIG. 14, it can be seen that a first stream (Stream 1) is activated.

The controller 210 or the block allocator 216 may read the block table information of the block pool 220 after the allocation of the write block for each of the streams is performed. Taking the block table of FIG. 14 as an example, the controller 210 or the block allocator 216 may determine, based on the block table of FIG. 14, that currently activated write blocks are B0 to B4 and currently inactivated streams are a second stream (Stream 2) and a third stream (Stream 3).

Subsequently, based on the block table of FIG. 14, the controller 210 or the block allocator 216 may allocate, to the first stream (Stream 1), write blocks B2 to B4 which have been allocated to the second stream (Stream 2) and the third stream (Stream 3) that are currently inactivated among the currently activated blocks B0 to B4.

The controller 210 or the block allocator 216 may allocate all of the activated write blocks B0 to B4 to the activated first stream (Stream 1), thereby updating the block table of FIG. 14 to the block table of FIG. 15. The controller 210 or the block allocator 216 may transmit the updated block table of FIG. 15 to the block pool 220.

The block tables of FIGS. 14 and 15 are merely examples, and the number of streams and activated streams and the number of write blocks allocated to each of the streams are not limited to these examples.

As described above, in the storage device or the storage system according to example embodiments, the number of write blocks allocated to each of a plurality of streams may be dynamically updated depending on a status of the host and/or the storage device, thereby maximizing the performance of the storage device or the storage system.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

Although a few example embodiments have been shown and described, it would be appreciated by those skilled in the art that changes may be made in example embodiments without departing from the principles and spirit of the disclosure, the scope of which is defined in the claims and their equivalents.

What is claimed is:

1. A storage device comprising:
    a nonvolatile memory device including a plurality of nonvolatile memories;
    a controller configured to allocate write blocks of the nonvolatile memory device to a plurality of streams provided from an outside; and
    a buffer memory configured to store a result of allocation of the write blocks to the plurality of streams,
    wherein the controller is further configured to reallocate the write blocks of the nonvolatile memory device to the plurality of streams based on the result of allocation stored in the buffer memory
    wherein the controller includes:
    a block calculator configured to calculate a number of the write blocks to be reallocated to the plurality of streams; and
    a block allocator configured to reallocate the write blocks to each of the plurality of streams based on the calculated number of the write blocks to be reallocated,
    wherein the controller further includes a block pool configured to store a block table in which write block information on write blocks currently allocated to each of the plurality of streams is recorded,
    wherein the block pool is further configured to receive information on a currently activated stream from the block allocator, and transmit write block information with respect to a currently inactivated stream to the block allocator, and
    wherein the block allocator is further configured to reallocate write blocks, allocated to the currently inactivated stream, to the currently activated stream.

2. The storage device of claim 1, wherein the controller further includes an information storage memory configured to store real-time information on the plurality of streams,
    wherein the real-time information on the plurality of streams includes data write frequency information on a number of times data is written into write blocks allocated to each of the plurality of streams, and
    wherein a write count table in which the write frequency information is recorded is stored in the information storage memory.

3. The storage device of claim 2, wherein a first write count table at a first time point is updated to a second write count table at a second time point,
    wherein the controller is further configured to calculate a number of write blocks to be reallocated to each of the plurality of streams based on the second write count table, and
    wherein the controller is further configured to reallocate the calculated number of write blocks to each of the plurality of streams.

4. The storage device of claim 1, wherein the controller is further configured to receive real-time information on the plurality of streams from the outside,
    wherein the real-time information on the plurality of streams includes target performance ratio information on a target performance ratio to be occupied by each of the plurality of streams,
    wherein the controller is further configured to calculate performance achievable by each of the plurality of streams based on the target performance ratio information,
    wherein the controller is further configured to calculate a number of write blocks to be allocated to each of the plurality of streams based on the calculated performance, and
    wherein the controller is further configured to allocate the calculated number of write blocks to each of the plurality of streams.

5. The storage device of claim 4, wherein the calculated performance is a transmission rate of each of the plurality of streams.

6. The storage device of claim 1, wherein the result of allocation is included in the nonvolatile memory device.

7. A storage system comprising:
    a host; and
    a storage device configured to receive a plurality of streams and first real-time information on the plurality of streams from the host,
    wherein the storage device includes:
    a nonvolatile memory device including a plurality of nonvolatile memories; and
    a controller configured to calculate a number of write blocks to be allocated to each of the plurality of streams based on the first real-time information, and allocate write blocks of the nonvolatile memory device to each of the plurality of streams based on a result of calculation wherein the host is configured to transmit, to the storage device, target performance ratio information on a target performance ratio to be occupied by each of the plurality of streams, wherein the controller is further configured to calculate performance achievable by each of the plurality of streams based on the target performance ratio information, and transmit the calculated performance to the host, and wherein the controller includes a block calculator configured to, upon receiving an approval on the calculated performance from the host, calculate the number of write blocks to be allocated to each of the plurality of streams based on the calculated performance.

8. The storage system of claim 7, wherein the storage device is further configured to compare the received first real-time information with second real-time information currently stored in the storage device, and transmit a result of comparison to the host, and wherein the storage device is further configured to, based on an approval received from the host based on the result of comparison, modify the second real-time information based on the first real-time information.

9. The storage system of claim 8, wherein the first real-time information includes at least one of:

the target performance ratio information on the target performance ratio to be occupied by each of the plurality of streams;

target performance of each of the plurality of streams; and the number of write blocks to be allocated to each of the plurality of streams.

10. The storage system of claim 7, wherein the controller further includes:

a block allocator configured to allocate the write blocks to each of the plurality of streams based on the number of the write blocks calculated by the block calculator.

11. The storage system of claim 10, wherein the controller further includes a block pool configured to store a block table in which write block information on write blocks currently allocated to each of the plurality of streams is recorded, wherein the block pool is further configured to receive information on a currently activated stream from the block allocator, and transmit the write block information on a currently inactivated stream to the block allocator, and wherein the block allocator is further configured to allocate write blocks allocated to the currently inactivated stream to the currently activated stream.

12. The storage system of claim 7, wherein the controller further includes an information storage memory configured to store third real-time information on the plurality of streams, wherein the third real-time information includes data write frequency information on a number of times data is written into each of the plurality of streams, and wherein a write count table in which the write frequency information is recorded is stored in the information storage memory.

13. The storage system of claim 12, wherein a first write count table at a first time point is updated to a second write count table at a second time point, and wherein the controller is further configured to calculate the number of write blocks to be allocated to each of the plurality of streams based on the second write count table.

14. A storage system comprising:

a host including a host memory, a processing unit configured to execute a program code loaded in the host memory, and an interface circuit configured to transmit data received from the host memory and the processing unit to an outside; and a storage device configured to exchange the data with the host, wherein the storage device includes:

a controller configured to allocate write blocks to each of a plurality of streams, the controller including a block calculator which calculates a number of write blocks to be reallocated to each of the plurality of streams based on first real-time information on the plurality of streams;

a memory device configured to exchange the data with the controller through a channel, the memory device including a plurality of nonvolatile memories; and a buffer memory including a memory different from the plurality of nonvolatile memories, wherein the controller further includes an information storage memory configured to store second real-time information on the plurality of streams, wherein the second real-time information on the plurality of streams includes write frequency information on a number of times data is written into each of the plurality of streams, and wherein a write count table in which the write frequency information is recorded is stored in the information storage memory.

15. The storage system of claim 14, wherein the controller further includes a block allocator configured to reallocate the write blocks to each of the plurality of streams based on the number of the write blocks calculated by the block calculator.

16. The storage system of claim 14, wherein the host is further configured to transmit, to the storage device, target performance ratio information for each of the plurality of streams, wherein the controller is further calculate performance achievable by each of the plurality of streams based on the target performance ratio information, and transmit the calculated performance to the host, wherein upon receiving an approval on the calculated performance from the host, the block calculator is further configured to calculate the number of write blocks to be reallocated to each of the plurality of streams based on the calculated performance.

* * * * *